(12) United States Patent
Matsumoto et al.

(10) Patent No.: US 8,268,470 B2
(45) Date of Patent: Sep. 18, 2012

(54) VENTILATOR OF A FUEL-CELL VEHICLE

(75) Inventors: Mitsunori Matsumoto, Saitama (JP); Masahiro Matsutani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 613 days.

(21) Appl. No.: 12/486,059

(22) Filed: Jun. 17, 2009

(65) Prior Publication Data
US 2009/0317692 A1 Dec. 24, 2009

(30) Foreign Application Priority Data
Jun. 19, 2008 (JP) .................................. 2008-160893

(51) Int. Cl.
*H01M 8/04* (2006.01)
*B60H 1/24* (2006.01)

(52) U.S. Cl. ............ 429/71; 429/72; 429/400; 429/513; 454/143; 454/158; 180/65.1; 180/68.1; 180/309

(58) Field of Classification Search .................... 429/71, 429/34, 400, 512, 513, 515, 71, 72; 454/143, 454/152, 158, 169, 69; 180/65.1, 68.1, 309
See application file for complete search history.

(56) References Cited

U.S. PATENT DOCUMENTS

| 7,028,791 | B2 * | 4/2006 | Chernoff et al. | 180/65.1 |
| 7,108,091 | B2 * | 9/2006 | Guidry et al. | 180/68.1 |
| 7,631,711 | B2 * | 12/2009 | Kubo | 180/68.1 |
| 7,926,601 | B2 * | 4/2011 | Ono et al. | 180/68.5 |
| 7,935,451 | B2 * | 5/2011 | Kabasawa | 429/450 |
| 2003/0037983 | A1 * | 2/2003 | Hanaya et al. | 180/309 |
| 2004/0265654 | A1 * | 12/2004 | Imaseki et al. | 429/13 |
| 2006/0113131 | A1 * | 6/2006 | Kato et al. | 180/65.3 |
| 2009/0191805 | A1 * | 7/2009 | Cusumano et al. | 454/158 |

FOREIGN PATENT DOCUMENTS

| JP | 2005235635 A | 9/2005 |
| JP | 2006-002588 | 1/2006 |
| JP | 2006-230143 | 8/2006 |
| JP | 2007-080655 A | 3/2007 |
| JP | 2007326474 A | 12/2007 |
| JP | 2008-094184 | 4/2008 |

OTHER PUBLICATIONS

Japanese Office Action dated Apr. 20, 2010, issued in corresponding Japanese Patent Application No. 2008-160893.
Japanese Office Action dated Apr. 5, 2011, issued in corresponding Japanese Patent Application No. 2008-160893.

* cited by examiner

*Primary Examiner* — Joseph Drodge
(74) *Attorney, Agent, or Firm* — Westerman, Hattori, Daniels & Adrian, LLP

(57) ABSTRACT

The present invention relates to a ventilator of fuel-cell vehicles for ventilating hydrogen in the hydrogen-system unit area arranging a hydrogen circulating device in the fuel-cell vehicles boarding the fuel cell. The ventilator of fuel-cell vehicle includes a first ventilating device for taking ventilating air in from a front side of the fuel-cell vehicle to hydrogen-system unit area arranging the fuel cell, the hydrogen supply device, and the hydrogen exhaust device in the center of front and rear direction of the fuel-cell vehicle; and a second ventilating device for sucking the ventilating air taken in from the rear end of vehicle body of the fuel-cell vehicle to the hydrogen-system unit area.

2 Claims, 3 Drawing Sheets

VENTILATOR OF A FUEL-CELL VEHICLE

TECHNICAL FIELD

The present invention relates to a ventilator of fuel-cell vehicles for ventilating hydrogen in the hydrogen-system unit area arranging a hydrogen circulating device in the fuel-cell vehicles boarding the fuel cell.

BACKGROUND ART

Conventionally, a fuel-cell power generator having the hydrogen-system unit area, which a fuel cell, a hydrogen supply device for supplying hydrogen to the fuel cell, and a hydrogen exhaust device for exhausting hydrogen from the fuel cell are arranged in the space between the floor panel and the under panel covering the bottom of vehicles, has been already known. For example, the patent literature (Japanese Unexamined Laid-open Publication No. 2007-80655) is given as an example. A suction device for sucking the ambient gas in the hydrogen-system unit area and a hydrogen detection device for detecting the hydrogen are provided in the fuel-cell vehicle.

Thus, the above fuel-cell vehicle is able to detect the leak of hydrogen by the hydrogen detection device provided near the suction port. Further, the above vehicle is able to ventilate the hydrogen by sucking hydrogen as leaked from the parts containing hydrogen in the hydrogen-system unit area. The suction device is able to cool down the ambient gas by exhausting toward the high pressure battery and cooling down it.

SUMMARY OF THE INVENTION

The conventional fuel-cell vehicle described in the above patent literature has a problem that a suction device becomes larger owing to the requirement of a suction device for a large amount of air in order to suck the ambient gas displaced far from the suction port, in a case where the parts containing hydrogen are long arranged in the front and rear direction of the vehicle.

Accordingly, an object of this invention is to provide a compact and high-efficient ventilator of the fuel-cell vehicle.

As the means for solving the above problem, the invention of the ventilator of the fuel-cell vehicle described in this application has a fuel cell for generating electricity by the supply of hydrogen and oxidizing gas, a hydrogen supply device for supplying hydrogen to the fuel cell, and a hydrogen exhaust device for exhausting hydrogen from the fuel cell. Further, the invention is characterized in that the invention includes the first ventilating device and the second ventilating device in the center of the front and rear direction of the fuel-cell vehicle, and the first ventilating device takes ventilating air in from the front side of the fuel-cell vehicle toward the hydrogen-system unit area arranging the fuel cell, and the second ventilating device sucks the ventilating air as taken in the hydrogen-system unit area from the rear side of vehicle body of the fuel-cell vehicle to the hydrogen-system unit area, and supplies the ventilating air toward the rear side of vehicle body.

According to the above invention of the ventilator of the fuel-cell vehicle, the ventilating air flows strongly and smoothly as the ventilating air is supplied by the first ventilating device from the front side of the fuel-cell vehicle to the hydrogen-system unit area in the center of the fuel-cell vehicle, and flowed into the second ventilating device. Accordingly, the ventilator can ventilate efficiently the ambient gas in the hydrogen-system unit area as arranged in the center of front and rear direction of the fuel-cell vehicle. Further, the parts containing hydrogen are long arranged in the front and rear direction of vehicle body, such that the air caused by driving a vehicle (as referred hereinafter to as the driving air) is sucked from the front side of the parts containing hydrogen by the first ventilating device, the driving air (ventilating air) is sucked by the second ventilating device to supply it to the rear side of vehicle. Then, even in a case where the ambient gas existed in a position far from the suction port is sucked, the ambient gas can be effectively ventilated, as the ambient gas is flowed by the first ventilating device and the second ventilating device at a high speed from the front side to the rear side of vehicle body.

Preferably, the hydrogen-system unit area is arranged inside a center tunnel of the fuel-cell vehicle. The ventilating channel for flowing the ventilating air from the first ventilating device has a throttle section formed by reducing in sectional area from the first ventilating device to the center tunnel.

According to the above constitution, the hydrogen-system unit area is arranged inside the center tunnel of the fuel-cell vehicle. Further, the ventilating channel of the ventilating air as discharged from the first ventilating device, forms a throttle section toward the center tunnel to reduce in sectional area of the channel. Thus, it makes faster the flow velocity of the ventilating air penetrating the hydrogen-system unit area arranged downstream of the throttle section. Further, as the center tunnel is formed to cover like a tunnel and to be approximately pipe-shape so as to flow the ventilating air in the hydrogen-system unit area toward the rear side of vehicle body, the flow of the ambient gas containing hydrogen leaked in the hydrogen-system unit area is directed to the rear side of vehicle body. As a result, it can promote effectively the ventilation of the ambient gas in the hydrogen-system unit area.

Preferably, the ventilating channel is formed from the front side of vehicle body of the fuel-cell vehicle through the hydrogen-system unit area to the rear side of vehicle body, and the second ventilating device is arranged in the ventilating channel.

According to the above constitution, the ventilating air flows strongly and smoothly from the front side to the rear side of vehicle body, as the ventilating channel arranging the second ventilating device is formed from the front side of vehicle body of the fuel-cell vehicle through the hydrogen-system unit area to the rear side thereof. Thus, the leaked hydrogen can be discharged from the rear side of vehicle body in a state to be stirred and diluted.

Preferably, the first ventilating device is a radiator fan for sucking the driving air from the front side of the fuel-cell vehicle.

According to the above constitution, the first ventilating device is a radiator fan making use of the driving air from the front side of the fuel-cell vehicle. Then, the driving air of the radiator fan for cooling down the cooling water of the fuel cell, auxiliary devices for power generation, and air conditioner can assist the ventilation thereof by the effective use as the ventilating air of the hydrogen-system unit area. Then, it improves the ventilating efficiency of the ventilator. As a result, the ventilating performance required for the first ventilating device can be obtained even in a small-size first ventilating device, and the miniaturization and power saving of the ventilator can be obtained.

Preferably, the ventilating channel is formed by an upper panel and a floor panel of a vehicle.

According to the above constitution, the leaked hydrogen can be detected more exactly, in a case where a hydrogen detection device is arranged downstream of the ventilating channel.

Preferably, the fuel cell vehicle arranges a storage device of electricity for accumulating electricity as generated by the fuel cell in the rear side of the hydrogen-system unit area, the second ventilating device sucks the ambient gas in the space of the hydrogen-system unit area, and the ambient gas is applied to the storage device of electricity to cool down it.

According to the above constitution, the ventilating air flowing from the front side to the rear side of vehicle body can be flowed more rapidly, as the second ventilating device in the fuel cell vehicle is designed for cooling down the storage device of electricity by sucking the ambient gas in the space of the hydrogen-system unit area. Thus, the ventilating performance of the ventilator and the cooling performance can be improved.

The present invention can provide a compact and efficient ventilator of the fuel-cell vehicle.

BEST MODE FOR CARRYING OUT THE INVENTION

A ventilator of the fuel-cell vehicle relating to an embodiment of the present invention will be described as referred to FIG. 1 to FIG. 3.

Figure 1:
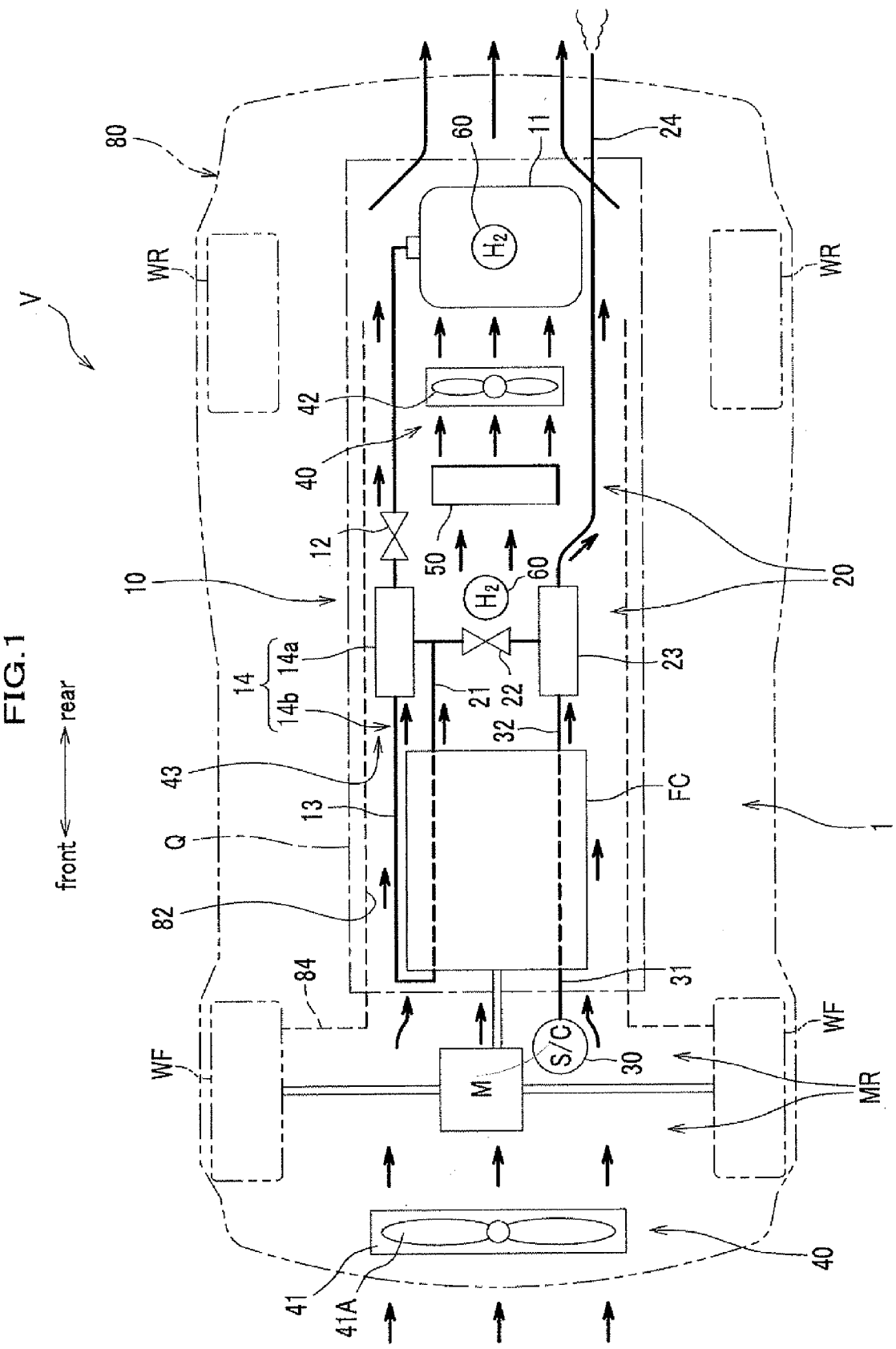
FIG. 1 is a schematic plan view showing a constitution of a ventilator of the fuel-cell vehicle relating to this embodiment.

FIG. 1 is a schematic plan view showing a constitution of the ventilator of the fuel-cell vehicle relating to this embodiment. FIG. 2 is a schematic side view showing a constitution of the ventilator of the fuel-cell vehicle relating to the embodiment of the present invention. FIG. 3 is an enlarged cross-sectional view taken along a line III-III of FIG. 2. In addition, FIG. 1 to FIG. 3 show schematically and exaggeratedly the hydrogen-system unit area Q arranging a fuel cell FC and the like, and the ventilating channel 43.

Constitution of the Fuel-Cell Vehicles

As shown in FIG. 1, the fuel-cell vehicle V is an electric vehicle driven by rotating the driving motor M by means of the power generation of the fuel cell FC. The fuel-cell vehicle V boards the fuel-cell power generator 1, which is provided with the below-describing fuel cell FC, a hydrogen supply device 10, a hydrogen exhaust device 20, a ventilator 40, and the like. As shown in FIG. 2, the fuel-cell vehicle V is provided with a vehicle compartment C, a motor room MR arranged at the front of the vehicle compartment C, a floor panel 81 as separated the vehicle compartment C from an under floor, a center tunnel 82 formed by the floor panel 81, an under panel 83 arranged under the floor panel 81, and a hydrogen-system unit area Q arranged in the center of the front and rear direction of the vehicle. The fuel-cell vehicle V is provided with various devices of the fuel cell power generator 1 in the space (ventilating channel 43) between the under panel of the floor panel 81 (as referred to FIG. 2) and the under panel 83 and in the motor room MR. In addition, the hydrogen-system unit area Q and the above space mean the same place.

Constitution of the Vehicle Compartment

Figure 2:
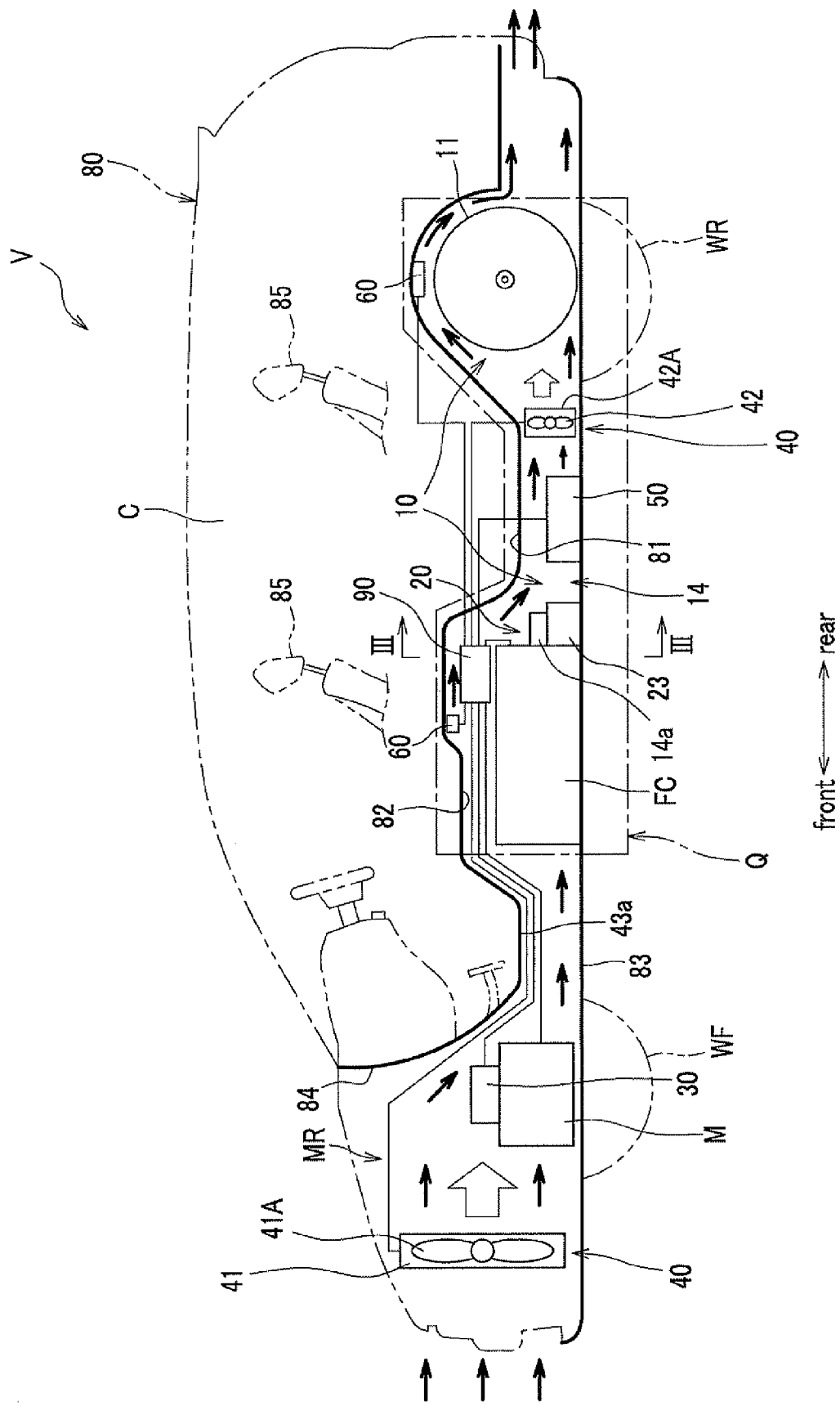
FIG. 2 is an essential portion of schematic side view showing a ventilator of the fuel-cell vehicle relating to the embodiment of this invention.
Figure 3:
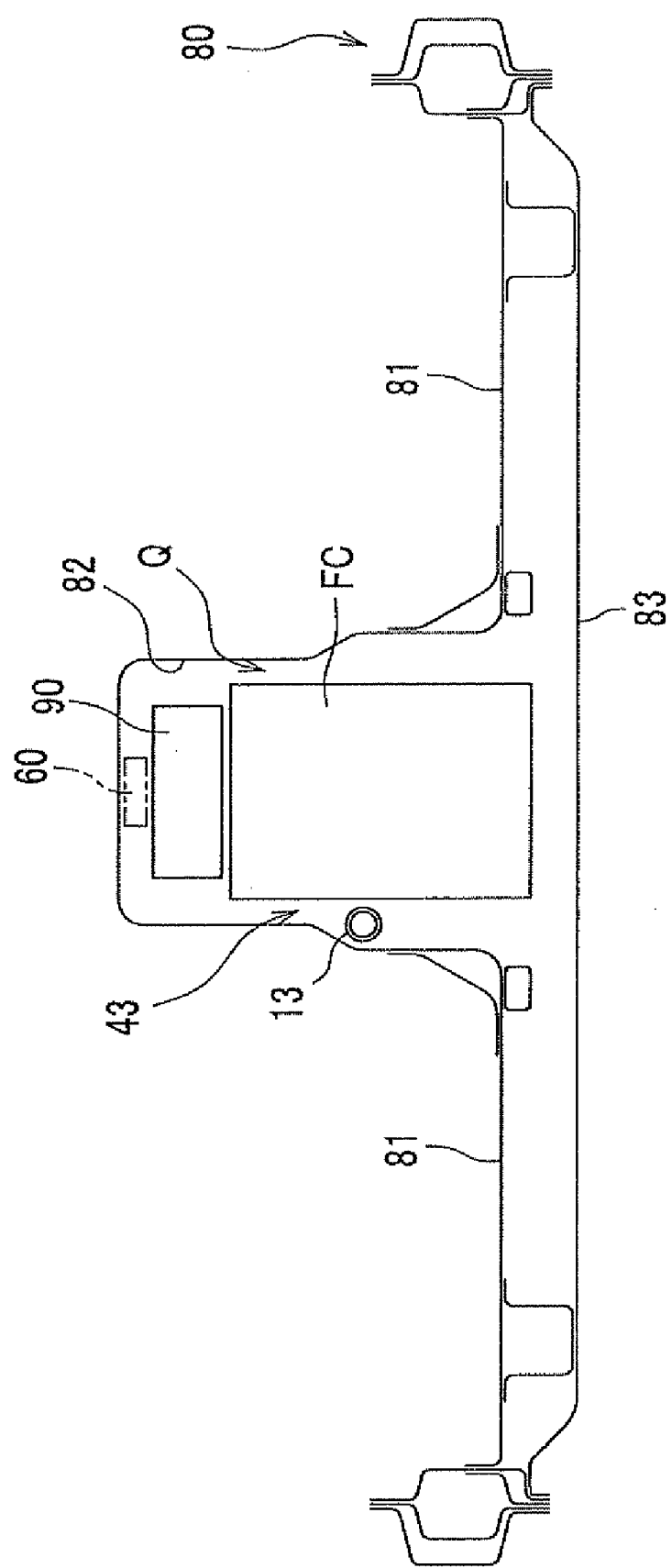
FIG. 3 is an enlarged cross-sectional view taken along the line III-III of FIG. 2.

As shown in FIG. 2, the vehicle compartment C is a room for boarding crews such as a driver to be arranged in the center of the vehicle body 80. The vehicle compartment C is formed over the floor panel 81, and a plurality of seats 85 are arranged on the floor panel 81. In the front of the vehicle compartment C, a motor room MR is arranged through an instrument panel (as not shown) and a separator plate 84. In the center of the under floor of the vehicle compartment C, a center tunnel 82 and a ventilating channel 43 are formed from the front end to the rear end.

Constitution of the Motor Room

As shown in FIG. 1, the motor room MR is a storage space for a driving motor M, a first ventilating device 41, an air compressor 30, and the like to be arranged in the front of the vehicle body. In the front side of vehicle body of the motor room MR, a guide plate (as not shown) for taking the driving air into the motor room MR and for flowing through the first ventilating device 41 is mounted. In the motor room MR, a separator plate 84 forming a rear inner wall of the motor room MR is mounted in the rear side of the vehicle body. In the motor room MR, the first ventilating device 41 is arranged in the center of the front end, the driving motor M is arranged between the left and right front wheels WF, WF, and the air compressor 30 is arranged around the rear side. In addition, the motor room MR is continuously provided with a center tunnel 82 extending from the lower end of the separator plate 84 to communicate with the below-describing ventilating channel 43.

Constitution of the Floor Panel

As shown in FIG. 2, the floor panel 81 is a plate forming a floor surface of the vehicle compartment C and the upper half body of the ventilating channel 43 to be made of metallic flat plate such as a steel plate provided on the whole floor surface. On the upper surface of the floor panel 81, a floor mat is laid thereon. In addition, the floor panel 81 is designed for permeating hydrogen or not.

Constitution of the Center Tunnel

The center tunnel 82 is a tunnel-shape floor tunnel formed by the floor panel 81, which extends linearly along the vehicle body 80 from the center of the separator plate 84 of the front end of the vehicle compartment to the rear side of the vehicle body 80. The inner wall of the center tunnel 82 forms the ventilating channel 43 and the upper half body of the hydrogen-system unit area Q. Thus, the inner space of the center tunnel 82 is designed for making the ventilating air to flow from the front side to the rear side of the vehicle body, and stores the below-describing hydrogen supply device 10, a fuel cell FC, a hydrogen exhaust device 20, a storage device of electricity 50, and the like. In addition, the center tunnel 82 forms space of the ventilating channel 43 and the hydrogen-system unit area Q.

Constitution of the Under Panel

As shown in FIG. 2, the under panel 83 is a member for protecting devices such as the fuel cell FC from obstacles on the rugged road and splash stones to be made of plate, which forms the bottom surface of the vehicle body 80. The under panel 83 is made of metallic flat plate member such as a steel plate as arranged to be appropriately horizontal through appropriate spaces located under the floor panel 81. The under panel 83 is formed to range from the front end to the rear end of the vehicle body 80. The under panel 83 forms the bottom surface of the motor room MR, the under surface of the ventilating channel 43, the under surface of the hydrogen-system unit area Q, and an installed surface for boarding the storage device of electricity 50 and the second ventilating device 42. The under panel 83 also forms the ventilating channel 43 of the ventilating air together with the separator plate 84, the floor panel 81, and the center tunnel 82. The under panel 83 forms the space of the hydrogen-system unit area Q together with the floor panel 81.

Constitution of the Separator Plate

As shown in FIG. 2, the separator plate 84 separates the motor room MR from the vehicle compartment C. The separator plate 84 is a plate forming the rear inner wall of the motor room MR and is continuously formed in the floor panel 81 as seen from the side. In the center of the lower end of the separator plate 84, the ventilating channel 43 and the center tunnel 82 are continuously formed along the vehicle body 80 from the lower portion of the center of the rear inner wall of the motor room MR toward the rear side of the vehicle body. The reduced portion of area 43a of the below-describing ventilating channel 43 is formed in the center of the lower end of the separator plate 84 and a dash board.

Constitution of the Hydrogen-System Unit Area

As shown in FIG. 1, the hydrogen-system unit area Q is an area in which the hydrogen-flowing device exists. The hydrogen-system unit area Q is also an area in which parts containing hydrogen such as the fuel cell FC, the hydrogen supply device 10, the hydrogen exhaust device 20 are arranged. In other words, the hydrogen-system unit area Q is an area for arranging hydrogen consuming device (plus hydrogen exhaust disposer). The hydrogen-system unit area Q is arranged inside the center tunnel 82 of the center of the vehicle in the front and rear direction (longitudinal direction) of the fuel-cell vehicle V, and the parts containing hydrogen such as the fuel cell, a part of the hydrogen supply piping 13, hydrogen circulating mechanism 14, hydrogen exhaust piping 21, hydrogen purge valve 22, and a diluter 23 are arranged therein.

Constitution of the Fuel-Cell Power Generator

The fuel cell power generator 1, by which the fuel cell FC is supplied with hydrogen and oxidizing gas to generate electricity and to rotate the driving motor M thereby, is an electric power generator for driving the fuel-cell vehicle V. The fuel cell power generator 1 is provided to comprise the below-describing fuel cell FC, the hydrogen supply device 10, the hydrogen exhaust device 20, the air compressor 30, the ventilator 40, the storage device of electricity 50, a hydrogen detection device 60, a control unit 90 (as referred to FIG. 2), and the like. The fuel cell power generator 1 is stored in the space formed between the floor panel 81 and under panel 83 of the fuel cell vehicle V and in the motor room MR (as referred to FIG. 2).

Constitution of the Fuel Cell

As shown in FIG. 1, the fuel cell FC is a structure of a plurality of single cell layers. The single cell is formed with a membrane electrode assembly (MEA) sandwiched by conductive separators as not shown. The membrane electrode assembly is formed in both sides of high-polymer electrolyte film, which is of monovalent cation exchange type, as sandwiched by an anode (a pole of hydrogen) and a cathode (a pole of air). The fuel cell FC is designed for generating electricity by electrochemical reaction such that the anode thereof is supplied with hydrogen and the cathode thereof is supplied with air (oxygen) as the oxidizing gas. The fuel cell FC is stored in the center tunnel 82 (as referred to FIG. 3).

Constitution of the Hydrogen Supply Device

The hydrogen supply device 10 is a device for supplying hydrogen to the fuel cell FC to comprise a high pressure hydrogen tank 11 having a cut-off valve 12, hydrogen supply piping 13, a hydrogen circulating mechanism 14, and the like.

Constitution of the High Pressure Hydrogen Tank

As shown in FIG. 1, the high pressure hydrogen tank 11 is a vessel for packing high-purity hydrogen under high pressure, which is the fuel supplying to the fuel cell FC. The high pressure hydrogen tank 11 is transversely arranged under a cargo room leading to the center tunnel 82 near the rear wheels WR, WR of the fuel cell vehicle V. The high pressure hydrogen tank 11 is connected to the cut-off valve 12.

Constitution of the Cut-Off Valve

The cut-off valve 12 is an electromagnetic valve for regulating the flow of fuel gas exhausted from the high pressure hydrogen tank 11 to connect through the piping to an ejector 14a. The cut-off valve 12 is electrically connected to the control unit (as referred to FIG. 2) to appropriately regulate the opening or closing of the valve thereby (as referred to FIG. 2 and FIG. 3).

Constitution of the Hydrogen Supply Piping

As shown in FIG. 1, the hydrogen supply piping 13 is a channel for supplying the fuel cell FC with hydrogen in the high pressure hydrogen tank 11. One end of the hydrogen supply piping 13 is connected to the fuel cell FC, and the other end thereof is connected to the high pressure hydrogen tank 11.

Constitution of the Hydrogen Circulating Mechanism

The hydrogen circulating mechanism 14 is designed for circulating the exhaust gas of hydrogen, as exhausted from the fuel cell FC, and back again to the hydrogen supply piping 13. The hydrogen circulating mechanism 14 comprises the ejector 14a, the hydrogen circulating piping 14b, and the like. The ejector 14a is provided on the way to the hydrogen supply piping 13. One end of the hydrogen circulating piping 14b is connected to the ejector 14a, and the other end thereof is connected to the fuel cell FC.

Constitution of the Hydrogen Exhaust Device

As shown in FIG. 1, the hydrogen exhaust device 20 is a device for exhausting hydrogen from the fuel cell FC to comprise the hydrogen exhaust piping 21, the hydrogen purge valve 22, the diluter 23, and the like.

Constitution of the Hydrogen Exhaust Piping

The hydrogen exhaust piping 21 is a channel for exhausting hydrogen exhausted from the fuel cell FC through the hydrogen purge valve 22, diluter 23, and the like to the outside. One end of the hydrogen exhaust piping 21 is connected to the outlet of the anode of the fuel cell FC, and the other end thereof is connected through the hydrogen purge valve 22 to the diluter 23. The hydrogen exhaust piping 21 is connected to the other end of the hydrogen circulating piping 14b.

Constitution of the Hydrogen Purge Valve

As shown in FIG. 1, the hydrogen purge valve 22 is an electromagnetic valve for exhausting the moisture mixed in the hydrogen circulating piping 14b and the other impurity in operation of the fuel cell power generator 1 to the outside. The hydrogen purge valve 22 is provided upstream of the diluter 23 of the hydrogen exhaust piping 21. In a case where the hydrogen density becomes lower on the ground that the nitrogen containing in the air supplied to the cathode of the fuel cell FC penetrates from the cathode through the electrolyte film to the anode, the hydrogen purge valve 22, by the opening of the valve if necessary, is designed for preventing from the breakage of power generation capacity owing to the lowering of hydrogen density.

Constitution of the Diluter

The diluter 23 is a device for diluting the anode-off gas (hydrogen), as exhausted through the hydrogen purge valve 22, by the cathode-off gas (air and water), as exhausted through the air exhaust piping 32 connecting from the diluter 23 to the cathode of the fuel cell FC. The hydrogen, as diluted equal to or lower than the prescribed hydrogen density in the diluter 23, is exhausted through the exhaust pipe 24 to the outside air.

Constitution of the Air Compressor

As shown in FIG. 1, the air compressor 30 is a supercharger and the like driven by a motor to supply the fuel cell FC through the air supply piping 31 with the compressed air (outside air).

Constitution of the Air Supply Piping

The air supply piping 31 is a channel for supplying the cathode of the fuel cell FC with air. One end of the air supply piping 31 is connected, for example, to the air compressor 30 for supplying with air, a humidifier (as not shown) for humidifying air, and the like, and the other end thereof is connected through piping to the cathode.

Constitution of the Storage Device of Electricity

The storage device of electricity 50 is a device for accumulating electricity as generated by the fuel cell FC. For example, the storage device of electricity 50 is mounted in the front side of vehicle body of the second ventilating device 42 arranged in the rear side of the center panel 82. That is, the storage device of electricity 50 is arranged in the rear side of the hydrogen-system unit area Q. The storage device of electricity 50 is constituted by a battery or a capacitor to be constituted by lead acid battery, lithium ion secondary battery, lithium polymer secondary battery, nickel-hydrogen battery, nickel-cadmium battery, and the like. The capacitor is constituted by an electric double-layer capacitor, an electrolytic capacitor, and the like. In addition, the storage device of electricity 50 is an assembly battery for appropriately assembling a plurality of small batteries, and comprises a frame body (base, case, etc.) storing a plurality of small-size batteries.

Constitution of the Ventilator

As shown in FIG. 1, the ventilator 40 is a device for ventilating by exhausting the leaked hydrogen leaked in the center tunnel 82 to the outside together with exhaust air, such that the driving air in the front side of the fuel cell vehicle V is taken in by sucking the vehicle body, and the ventilating air is flowed from the motor room MR through the center tunnel 82 to the rear side of the vehicle body. The ventilator 40 is provided for comprising the first ventilating device 41, which takes the ventilating air in from the front side of the fuel cell vehicle V toward the hydrogen-system unit area Q arranging the parts containing hydrogen penetrating hydrogen, the second ventilating device 42, which sucks the ventilating air taken in the hydrogen-system unit area Q, the ventilating channel 43, which is formed from the front side of the vehicle body through the first ventilating device 41 and the second ventilating device 42 to the rear side of the vehicle body.

Constitution of the First Ventilating Device

The first ventilating device 41 is a device for sucking the driving air caused by driving a vehicle from the front side of the vehicle body and supplying toward the hydrogen-system unit area Q with the ventilating air. The first ventilating device 41 is, for example, a radiator fan 41A.

As shown in FIG. 2, the radiator fan 41A is a device for air-cooling the water as thermal medium, which cools down the fuel cell FC and the driving motor M. The radiator fan 41A is arranged in the central front end of the motor room MR to supply toward the center tunnel 82 with the driving air. The radiator fan 41A is electrically connected to the control unit 90, thus to control the velocity of rotation by means of the control unit 90.

Constitution of the Second Ventilating Device

The second ventilating device 42 is a device for cooling down the storage device of electricity 50 such that the ambient gas containing the ventilating air and the leaked hydrogen and the like in the hydrogen-system unit area Q and the center tunnel 82 is sucked from the rear side of the fuel cell vehicle V, and the ambient gas is applied to the storage device of electricity 50. The second ventilating device 42 is an electric fan 42A. The second ventilating device 42 is arranged in the rear side of the center tunnel 82 and the hydrogen-system unit area Q forming the ventilating channel 43. The second ventilating device 42 is electrically connected through the control unit 90 to the vehicle velocity detection device (as not shown). Then, the second ventilating device 42 is designed for changing (increasing or decreasing) the speed of rotation of the electric fan 42A according to the vehicle velocity detected by the vehicle velocity detection device.

As shown in FIG. 2, the electric fan 42A is arranged such that the rotational axis crosses perpendicular to the wall surface of the storage device of electricity 50. The electric fan 42A is designed for exhausting outside such that the ambient gas in the hydrogen-system unit area Q and the center tunnel 82 is sucked by the rotation of the propeller.

Constitution of the Ventilating Channel

The ventilating channel 43 is a channel through which the leaked hydrogen and the ventilating air discharged from the hydrogen supply device 10 and the like flow. The ventilating channel 43 is formed along a center line of the vehicle body 80 extending from the motor room MR in the front end portion of vehicle body of the fuel cell vehicle V through the throttle section 43a, the center tunnel 82, and the hydrogen-system unit area Q to the rear end portion of vehicle body, as seen from the top. The ventilating channel 43 is arranged between the under panel 83 and the floor panel 81, as seen from the side. Inside the ventilating channel 43, the first ventilating device 41 is arranged in the front end portion thereof and the second ventilating device 42 is arranged in the rear end portion thereof. The driving motor M, the air compressor 30, the fuel cell FC, the hydrogen supply device 10, the hydrogen exhaust device 20, the storage device of electricity 50, and the like are arranged between the first ventilating device 41 and the second ventilating device 42. Each device, the parts, and the like, which constitute the fuel cell power generator 1, are arranged in the ventilating channel 43 to ventilate and cool down efficiently the air in the ventilating channel 43 by the ventilator 40.

The throttle section 43a is formed to make faster the flow velocity of the ventilating air flowing in the ventilating channel 43. The throttle section 43a is formed to reduce the area from the motor room MR in the front side of vehicle body to the center tunnel 82.

Constitution of the Hydrogen Detection Device

As shown in FIG. 2, the hydrogen detection device 60 is designed for the detection of hydrogen leaked from the hydrogen-system unit area Q. The hydrogen detection device 60 is arranged at an upper position such as a position of upper end portion in the center tunnel 82, which is the upper portion in the hydrogen-system unit area Q, and an upper position over the high pressure hydrogen tank 11. In addition, the hydrogen detection device 60 is electrically connected to the control unit 90.

Constitution of the Control Unit

The control unit 90 is a device for controlling the fuel cell power generator 1 and the ventilator 40. The control unit 90 is connected to an ignition switch (as not shown) to operate in conjunction with ON or OFF of the ignition switch. The control unit 90 is constituted by devices such as, for example, CPU, ROM, RAM, various interfaces, electronic circuit. The control unit 90 is designed for controlling the ventilator 40 to drive at an appropriate velocity of rotation according to the leaked hydrogen detected by the hydrogen detection device 60, the vehicle velocity detected by the vehicle velocity detection device, and the temperature of devices such as the driving motor M detected by a sensor of temperature (as not shown).

Operation of the Ventilator of the Fuel Cell Vehicle

Next, an operation of the ventilator 40 of the fuel cell vehicle V relating to this embodiment will be described.

At first, when a driver makes the ignition switch (as not shown) of the fuel cell vehicle V to be ON, the control unit 90 (as referred to FIG. 2) opens the cut-off valve 12 and drives the air compressor 30 by means of electricity (electric power) accumulated in the storage device of electricity 50 as shown in FIG. 2.

Thus, hydrogen in the high pressure hydrogen tank 11 is supplied through the hydrogen supply piping 13 to the anode of the fuel cell FC, and the air humidified by the humidifier (as not shown) is supplied from the air compressor 30 through the air supply piping 31 to the cathode of the fuel cell FC. Then, electrochemical reaction between hydrogen and oxygen in the humidified air generate electricity, which is supplied to the load such as the driving motor M, and drive the driving wheels (front wheel WF, WF) of the fuel cell vehicle V by the rotational force of the driving motor M.

The hydrogen exhausted from the anode of the fuel cell FC is re-circulated by introducing through the hydrogen circulating piping 14b to the anode of the fuel cell FC in order to enhance the efficiency in use of hydrogen. In the process of hydrogen purging, hydrogen exhausted through the hydrogen purge valve 22 is introduced to the diluter 23, and also exhausted to the outside air through the exhaust pipe 24 after the hydrogen has been diluted by the cathode-off gas (mainly air, and water) exhausted from the cathode of the fuel cell FC, until the density of hydrogen equal to or less than the prescribed value.

For example, as shown in FIG. 1 and FIG. 2, in driving the fuel cell vehicle V, the driving air taken in from the front side of vehicle cools down various devices such as the driving motor M and the air compressor 30 to be supplied by the guide plate to the motor room MR, and flow though the channel between the floor panel 81 and the under panel 83 forming the ventilating channel 43 to the rear side of vehicle body. Then, the leaked hydrogen and the like in the hydrogen-system unit area Q is flowed away to the rear side of vehicle body.

In this case, as the ventilating channel 43 forms the center tunnel 82 ranging from the motor room MR to the rear side of vehicle body, the throttle section 43a existed in the front end portion of the center tunnel 82 reduces in sectional area, the ventilating air flowing through the ventilating channel 43 makes faster in its flow velocity. Thus, the ventilating air flowing through the center tunnel 82 is discharged to the rear side of vehicle body such that the ventilating air increases in flow velocity around the front side of vehicle body, and scavenges the ambient gas containing hydrogen and the like leaked in the hydrogen-system unit area Q.

Accordingly, the leaked hydrogen can be discharged to the rear side of vehicle, as shown by an arrow of FIG. 1 and FIG. 2, together with the ambient gas in the hydrogen-system unit area Q, even if the leak of hydrogen occurs in the connecting portion and the sealing portion such as piping located in the hydrogen-system unit area Q arranging the parts containing hydrogen.

In case of driving the ventilator 40, during driving or stopping of the fuel cell vehicle V, the radiator fan 41A of the first ventilating device 41 takes the driving air in the front side of vehicle body in the motor room MR and brings to the center tunnel 82 as the ventilating air. Further, the ventilating air and the ambient gas in the hydrogen-system unit area Q are sucked to the rear side of vehicle body by the electric fan 42A of the second ventilating device 42 arranged in the rear side of the center tunnel 82. Thus, the ventilating air is flowed at rapid flow velocity through the ventilating channel 43 between the floor panel 81 and the under panel 83 toward the rear side of vehicle body, and is discharged toward the rear side of vehicle body in a uniform density diluted by stirring hydrogen leaked from the hydrogen-system unit area Q.

Accordingly, the ventilator 40 can ventilate effectively the ventilating air containing the leaked hydrogen through the ventilating channel 43 formed by the center tunnel 82, and the first ventilating device 41 and the second ventilating device 42 arranged in the front and rear of the center tunnel 82. As a result, even in a device with small ventilating capacity, the ventilating capacity required for the device can be obtained. Hence, the miniaturization of the first ventilating device 41 and the second ventilating device 42 can be easily obtained, and the saving of weight, cost, and consuming electric power can be also obtained.

At the time of driving the ventilator 40, the driving air fulfills the function for assisting the ventilating air, as the driving air flows as the ventilating air from the front side of the fuel cell vehicle V toward the rear side of vehicle body. Thus, the miniaturization of the first ventilating device 41 and the second ventilating device 42 as well as the saving of weight, cost, and consuming electric power can be remarkably improved.

The flow velocity of the driving air becomes faster according to the vehicle velocity of the fuel cell vehicle V. The rotational velocity of the radiator fan 41A of the first ventilating device 41 and the electric fan 42A of the second ventilating device 42 are designed for controlling its velocity by changing (increasing or decreasing) according to the vehicle velocity of the fuel cell vehicle V detected by the vehicle detection device. That is, as the ventilating channel 43 is formed to flow smoothly in the direction of high-speed flow of the driving air in case of high-speed drive, the good and satisfactory ventilating performance can be obtained even in case of stopping of the ventilator 40.

In case of stopping a vehicle or the ventilator 40, the hydrogen detection device 60 is provided in the hydrogen-system unit area Q. On detecting the leak of hydrogen by the hydrogen detection device 60, the control unit 90 is designed for switching the ventilator 40 to be ON by the detection signal. Thus, the first ventilating device 41 and the second ventilating device 42 are automatically driven to be able to ventilate the air in the hydrogen-system unit area Q.

As hydrogen is an extremely light substance in weight compared with the air, the leaked hydrogen can be definitely detected by providing the hydrogen detection device 60 in the upper and downstream side of the ventilating channel 43 (center tunnel 82) between the floor panel 81 and the under panel 83.

As the storage device of electricity 50 is arranged in the rear side of the center tunnel 82 forming the ventilating channel 43, it is able to cool down efficiently by applying the ventilating air flowing from the hydrogen-system unit area Q toward the rear side of vehicle body to the storage device of electricity 50. Thus, the number of parts and the space for mounting various devices can be effectively saved as it is not necessary to provide the separate means for cooling down so as to cool down the storage device of electricity 50.

MODIFICATION

The present invention is not limited to the above embodiment, but various modifications and alterations can be made within the scope of the technical thought thereof. The present invention can be naturally extend to the invention to be modified and altered, without departing from the spirit or essential character thereof.

Although the above embodiment has been described by taking an example of passenger car model as a fuel-cell vehicle V, the fuel-cell vehicle V may not be limited to the above model. For example, the fuel-cell vehicle V may be a bus, a truck, or a working car. That is, the fuel-cell vehicle V may be a vehicle which is provided with an under panel 83 on the bottom surface of the vehicle body 80, a plate member corresponding to the floor panel 81 spaced at an appropriate interval over the under panel 83, the ventilating channel 43 between the under panel 83 and the floor panel 81, the hydrogen-system unit area Q in the center of the ventilating channel 43, and the first ventilating device 41 and the second ventilating device 42 arranged in the front and rear side thereof.

What is claimed is:

1. A ventilator of a fuel-cell vehicle having
   a fuel cell for generating electricity by supplying hydrogen and oxidizing gas,
   a hydrogen supply device for supplying hydrogen to the fuel cell, and a hydrogen exhaust device for exhausting hydrogen from the fuel cell,
   the ventilator comprising:
   a first ventilating device for taking ventilating air in from a front side of the fuel-cell vehicle to a hydrogen-system unit area arranging the fuel cell, the hydrogen supply device, and the hydrogen exhaust device in a center of a front and rear direction of the fuel-cell vehicle; and
   a second ventilating device, located rearwardly in the vehicle with respect to the first ventilating device, for sucking ventilating air from the hydrogen-system unit area, and supplying the ventilating air toward a rear side of a vehicle body,
   wherein
   the first ventilating device comprises of a radiator fan sucking outside air from the front side of the fuel-cell vehicle,
   the hydrogen-system unit area is provided to form a space by an under panel and a floor panel, and a part of the floor panel is arranged inside a center tunnel of the fuel-cell vehicle extending in the front and rear direction, to be in a shape of tunnel and
   a ventilating channel, for flowing the ventilating air discharged from the first ventilating device, is formed by the under panel, a separator plate, separating a motor room from a vehicle compartment, the floor panel, and the center tunnel and wherein,
   the ventilating channel has a throttle section formed by reducing in sectional area from the first ventilating device to a front end of the center tunnel as seen from the top and the side, and forms from the front side of the fuel-cell vehicle through the center tunnel and the hydrogen-system unit area to the vehicle body, of a rear side of the vehicle body to extend from the throttle section to the rear side of the vehicle body, and
   wherein the separator plate, which is a plate forming the rear inner wall of the motor room, is continuously formed in the floor panel as seen from the side, the ventilation channel and the center tunnel are continuously formed along the vehicle body from a lower portion of the center of a rear inner wall of the motor room toward the rear side of the vehicle body, and
   wherein a reduced portion of the ventilating channel is formed in the center of the lower end of the separator plate and a dash board, and
   wherein the second ventilating device is arranged in the ventilating channel extending from the throttle section toward the rear side of the vehicle body, and the fuel-cell vehicle is provided with a storage device of electricity, in a rear side of the hydrogen-system unit area, for accumulating electricity as generated by the fuel cell, and
   wherein the second ventilating device is designed for sucking an ambient gas in the space of the hydrogen-system unit area and applying the ambient gas to the storage device of electricity to cool down the storage device of electricity.

2. A ventilator of fuel-cell vehicle according to claim 1, wherein the second ventilating device is electrically connected to a vehicle velocity detection device through a control unit, for changing a speed of rotation of the electric fan according to a vehicle velocity detected by the vehicle velocity detection device.

* * * * *